July 1, 1930.  A. M. HINKSON  1,769,513
PROCESS FOR MANUFACTURE OF MOISTUREPROOF PAPER
Filed July 30, 1928

INVENTOR
A. M. Hinkson
BY Lester L. Sargent
ATTORNEY

Patented July 1, 1930

1,769,513

UNITED STATES PATENT OFFICE

ADELBERT M. HINKSON, OF NIAGARA FALLS, NEW YORK

PROCESS FOR MANUFACTURE OF MOISTUREPROOF PAPER

Application filed July 30, 1928. Serial No. 296,398.

My invention relates to a novel process for the manufacture of a moisture-proof paper and it is the especial object of my invention to provide a process by means of which a paper of this character can be made at small cost, for use for building purposes as sheeting paper and flooring paper and also for use for box liners and roll wrappers.

Figure 1:
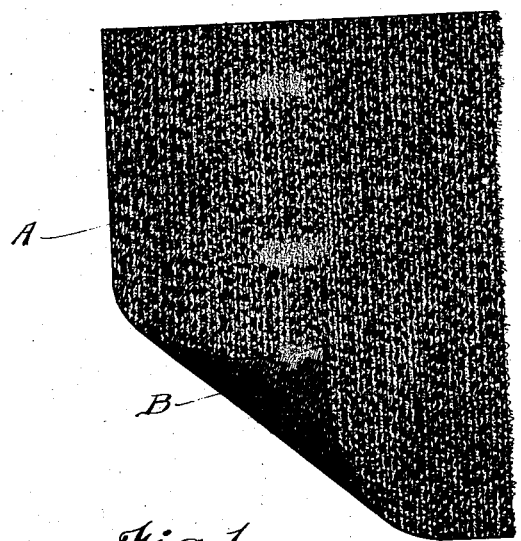
Figure 2:
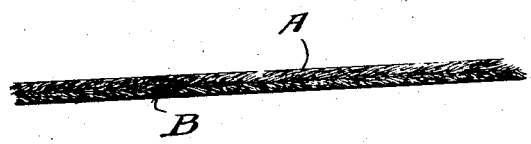

Referring to the accompanying sheet of drawings:

Figure 1 is a face view of the paper, the sides A and B being of different colors; and Fig. 2 is an edge view of same.

In carrying out my process I mix old bread wrappers and wax paper together with asphalt waste in the beater of a paper making machine and beat the material up together with hot water into a mass. The paper is then run onto a cylinder machine and colored on both sides. It is made into small sheeting rolls.

By applying the wax paper and asphalt papers together I produce a very pliable sheet which is absolutely waterproof. The papers are worked up in the proportion of about fifty per cent each of wax paper and of asphalt waste; or I may take in mixed paper and add asphalt and paraffin wax in the beater and mix in the same way. The paper can then be run over in a cylinder machine and made at very rapid speed.

What I claim is—

1. The process of producing a moisture-proof paper at small cost, consisting in mixing wax paper with asphalt waste in the proportions of approximately fifty per cent of each and beating them up in a beater with hot water, then running the material onto a cylinder machine and coloring on both sides; and thereafter making it into small sheeting rolls.

2. The process of producing a moisture-proof paper, consisting in mixing waste wax paper with asphalt waste directly in the beater of a paper making machine and beating the material up together with hot water into a mass, running the paper onto a cylinder machine, and suitably coloring the sheets.

3. The process of producing a moisture-proof paper, consisting in mixing waste wax paper with asphalt waste directly in the beater of a paper making machine, beating the material up together with hot water into a mass, and running the paper onto a cylinder machine.

4. The process of producing a moisture-proof paper, consisting in adding asphalt and paraffin wax directly in the beater with waste wax paper; and thereafter running the paper over a cylinder machine.

5. The process of producing a moisture-proof paper, consisting in adding asphalt and paraffin wax directly in the beater with waste wax paper; and thereafter running the paper over a cylinder machine, coloring the paper on both sides, and making it into small sheeting rolls.

ADELBERT M. HINKSON.